United States Patent
Itkis

(10) Patent No.: US 7,263,611 B2
(45) Date of Patent: Aug. 28, 2007

(54) KEY MANAGEMENT FOR CONTENT PROTECTION

(75) Inventor: Yevgeny Yakov (Gene) Itkis, Ma'aleh Adumim (IL)

(73) Assignee: NDS Ltd., Middlesex (GB)

(*) Notice: Subject to any disclaimer, the term of this patent is extended or adjusted under 35 U.S.C. 154(b) by 205 days.

(21) Appl. No.: 11/050,110

(22) Filed: Feb. 3, 2005

(65) Prior Publication Data

US 2005/0154883 A1    Jul. 14, 2005

Related U.S. Application Data

(62) Division of application No. 09/502,867, filed on Feb. 11, 2000, now Pat. No. 6,880,081.

(30) Foreign Application Priority Data

Jul. 15, 1999    (IL) .......................... 130963

(51) Int. Cl.
*H04L 9/14* (2006.01)
*H04K 1/00* (2006.01)

(52) U.S. Cl. ...................... 713/163; 380/278
(58) Field of Classification Search ............ 380/278; 713/163

See application file for complete search history.

(56) References Cited

U.S. PATENT DOCUMENTS 4,440,976 A    4/1984    Bocci et al.

(Continued)

FOREIGN PATENT DOCUMENTS

EP    0207534    1/1987

(Continued)

OTHER PUBLICATIONS

Stinson, D.R. "Crytography Theory and Practice." *In Discrete Mathematics and Its Applications* (CRC Press Inc) (1995) pp. 280-409.

(Continued)

*Primary Examiner*—David Y. Jung
*Assistant Examiner*—Matthew Heneghan
(74) *Attorney, Agent, or Firm*—Ladas and Parry LLP

(57) ABSTRACT

A method for content access control operative to enable authorized devices to access protected content and to prevent unauthorized devices from accessing protected content, the method comprising: providing a plurality of authorized devices; dividing the plurality of authorized devices into a plurality of groups, each of the plurality of authorized devices being comprised in at least one of the plurality of groups, no two devices of the plurality of authorized devices being comprised in exactly the same groups; determining whether at least one device of the plurality of authorized devices is to be prevented from having access to the protected content and, if at least one device is to be prevented, removing all groups comprising the at least one device from the plurality of groups, thus producing a set of remaining groups; and determining an authorized set comprising groups from the set of remaining groups, such that each device of the plurality of authorized devices which was not determined, in the determining whether step, to be prevented from having access is comprised in at least one group of the authorized set.

47 Claims, 4 Drawing Sheets

U.S. PATENT DOCUMENTS

| | | | |
|---|---|---|---|
| 4,771,458 A | | 9/1988 | Citta et al. |
| 4,782,529 A | | 11/1988 | Shima |
| 4,926,475 A | | 5/1990 | Spiotta et al. |
| 5,309,516 A | | 5/1994 | Takaragi et al. |
| 5,426,700 A | * | 6/1995 | Berson .................. 713/186 |
| 5,550,575 A | | 8/1996 | West et al. |
| 5,592,552 A | * | 1/1997 | Fiat ........................ 713/163 |
| 5,661,803 A | | 8/1997 | Cordery et al. |
| 5,812,666 A | | 9/1998 | Baker et al. |
| 5,889,863 A | | 3/1999 | Weber |
| 5,892,900 A | | 4/1999 | Ginter et al. |
| 6,035,405 A | | 3/2000 | Gage et al. |
| 6,151,394 A | | 11/2000 | Tatebayashi et al. |
| 6,195,751 B1 | | 2/2001 | Caronni et al. |
| 6,263,435 B1 | | 7/2001 | Dondeti et al. |
| 6,530,020 B1 | | 3/2003 | Aoki |
| 6,880,081 B1 | * | 4/2005 | Itkis ........................ 713/163 |

FOREIGN PATENT DOCUMENTS

| | | |
|---|---|---|
| EP | 0781003 | 6/1997 |
| EP | 0896483 | 2/1999 |
| WO | 9919822 | 4/1999 |
| WO | 0103365 | 1/2001 |

OTHER PUBLICATIONS

Fiat, A., et al. "Broadcast Encryption." *Crypto Annual Conference* (1993) pp. 481-491.

Canetti,R., et al., "Multicase Security: A Taxonomy and Some Efficient Constructions." *IEEE INFOCOM-99* (1999) pp. 1-9.

Canetti,R., et al., "A Taxonomy of Multicast Security Issues." *IBM Research and the Weizmann Institute* (1999) pp. 1-15.

Itkis, G., et al., "Asymmetric MACs Secure IP Multicast and Other East Crypto." *Slide Presentation, NDS Israel* (1999) pp. 1-14.

Itkis, G., et al., "The Role of Revocation in Content Protection: White Paper." *NDS Israel;* (Doc. No. WP-R028) (1998) pp. 1-13.

Wallner, D., et al. " Key Management For Multicast: Issues and Architectures." *National Security Agency* (1999) pp. 1-46.

Itkis, G. "Improved Key Distribution System." *NDS Israel* (1999) pp. 1-7.

* cited by examiner

KEY MANAGEMENT FOR CONTENT PROTECTION

RELATED APPLICATION INFORMATION

This is a divisional application of U.S. patent application Ser. No. 09/502,867, of Yevgeny Yakov (Gene) Itkis, filed Feb. 11, 2000 now U.S. Pat. No. 6,880,081 claims the benefit thereof and incorporates the same by reference.

FIELD OF THE INVENTION

The present invention relates to content access control and related technologies in general, including methods and apparatus relating to: content access control; security elements useful in content access control; and analysis of devices usable in content access control.

BACKGROUND OF THE INVENTION

The problem of key management, particularly in broadcast and multicast environments, is well known in the art. Various approaches to solving the problem have been proposed. Generally, the problem relates to distribution of encrypted items and controlling access thereto; to the problem of invalidation (blacklisting) of one or a plurality of receivers which have become compromised; and related issues. Generally, the problem of blacklisting has been considered to be the most difficult part of key management.

The problem to be solved in key management can be presented as follows.

The context is content protection. More specifically, Content Providers distribute their content in some way, e.g. on CD (or DVD) disks. The consumers consume the content using their consumer electronics devices, e.g. such as a personal stereo device. In order to protect the content from being stolen (e.g., illicit copies of it been made) the devices may implement certain restrictions: e.g. a personal stereo device may be required to have no digital outputs. One potential threat is that pirates may manufacture their own versions of the devices, which will not observe these restrictions. In such cases, the goal is to prevent the pirate devices from accessing the content.

One way to achieve the goal is to encrypt all content and to embed all legitimate devices with some secrets, such that they enable these devices to decrypt the content. In fact, this is the venue explored by one of the solutions: so, called 4C (proposed by 4 companies: IBM, Intel, Matsushita and Toshiba). One problem that arises in this approach is that the pirates may reverse-engineer some of the legitimate devices and extract the embedded secrets. These secrets may then be used by the pirate devices.

The goal may thus reformulated as follows:

1. The content is distributed in the encrypted form, with K denoting the key used for the encryption (K could be a "key-encrypting-key")

2. Accompanying the content is a key block B (the key block can be assumed to include "media key"—e.g., the disc's serial number, etc.).

The desired property is:

3. B can be computed (by the content providers, after examining the pirate devices) in such a way that all non-compromised devices can compute K from B, while the pirate devices cannot.

A methodology for computing B (and computing K from B) is provided by a preferred embodiment of the present invention, as described below. For brevity, we refer to this problem as the key distribution problem, KD for short.

Here are some related terms:

Blacklist: the list of devices to which the access to content is to be denied (namely, no blacklisted device can obtain K from B, while all non-blacklisted devices can).

Coalition: the set of legitimate devices reversed-engineered by one pirate group. The secrets extracted from a coalition are used by the respective pirate group to produce their pirate devices. Coalitions are usually assumed to be subsets of the blacklist. However, there might be many pirate groups, each working separately to build their own version of pirate devices.

If all the device of some coalition are blacklisted, then any pirate device constructed using the secrets obtained from these devices is prevented from accessing the content: i.e. it will not be able to compute K from B.

The following publications provide a general background to the field:

R. Canetti. J. Garay, G. Itkis, D. Micciancio. M. Naor, and B. Pinkas, "Multicast Security: A Taxonomy and Efficient Authentication", IEEE INFOCOM-99, March 1999;

A. Fiat and M. Naor. "Broadcast Encryption", Crypto-93, 1993;

G. Itkis. "Improved Key Distribution System", presented at CPTWG. April. 1999. G. Itkis being the inventor of the present invention, a slide presentation accompanying the presentation being available via the Internet at http://www.ndsworld.com/cmp/cmp_docs/mcastcp2.ppt;

D. M. Wallner, E. J. Harder and R. C. Agee, "Key Management for Multicast: Issues and Architectures", internet draft, 1998, available via the Internet at ftp://ftp.ietf.org/internet-drafts/draft-wallner-key-arch-01.txt.

The 4C group is said to be working on a solution to the key distribution problem along the lines of the A. Fiat and M. Naor publication, referred to above, but details of their approach have not been made publicly available. It is known that in the A. Fiat and M. Naor approach, also termed herein the Broadcast Encryption (BE) approach, a preset upper bound on the coalition size of blacklisted devices against which the approach protects if they are working together is set, and various parameters such as the key block size depend on the upper bound. Such a scheme typically becomes not secure when a coalition greater in size than the upper bound is formed.

The disclosures of all references mentioned above and throughout the present specification are hereby incorporated herein by reference.

SUMMARY OF THE INVENTION

The present invention seeks to provide improved apparatus and methods for content access control.

In a preferred embodiment of the present invention, an improved key distribution system is provided, the improved key distribution system having the following features:

1. There is no inherent upper bound on blacklist size or on coalition size; therefore, it will preferably not be possible to produce a device which can not be blacklisted.

2. The key block size depends on the blacklist size, preferably nearly linearly.

3. In contrast to the prior art, K may typically be obtained from B in the present invention by a legitimate device in a single decryption operation.

4. The approach is deterministic, in that every device can be blacklisted no matter how many and no matter which devices were reverse engineered to produce a pirate device.

In fact, for certain choices of devices to reverse engineer, it may become easier to blacklist a pirate device.

5. Secrets used by different manufacturers may be completely independent. One consequence of this fact, if secrets actually are independent, is that a security breach may be traceable to a particular manufacturer or factory, and possibly to a specific date, time, location, and/or person responsible.

6. Black box analysis, that is, analysis of a device to determine which secrets it knows by challenge and response without reverse engineering of the device, is relatively easy, so that analysis of pirate devices is relatively easy.

7. Keys may be produced easily such as, for example, pseudo-randomly.

There is thus provided in accordance with a preferred embodiment of the present invention a method for content access control operative to enable authorized devices to access protected content and to prevent unauthorized devices from accessing protected content, the method including providing a plurality of authorized devices, dividing the plurality of authorized devices into a plurality of groups, each of the plurality of authorized devices being included in at least one of the plurality of groups, no two devices of the plurality of authorized devices being included in exactly the same groups, determining whether at least one device of the plurality of authorized devices is to be prevented from having access to the protected content and, if at least one device is to be prevented, removing all groups including the at least one device from the plurality of groups, thus producing a set of remaining groups, and determining an authorized set including groups from the set of remaining groups, such that each device of the plurality of authorized devices which was not determined, in the determining whether step, to be prevented from having access is included in at least one group of the authorized set.

Further in accordance with a preferred embodiment of the present invention the method includes assigning, to each one of the plurality of authorized devices, a set of keys including one group key for each group of which the one device is a member, and utilizing at least some of the group keys for communication of a content decryption key to at least one of the plurality of authorized devices.

Still further in accordance with a preferred embodiment of the present invention the utilizing step includes, for each of the plurality of authorized devices obtaining the content decryption key, wherein the obtaining includes performing no more than a predetermined number of decryptions.

Additionally in accordance with a preferred embodiment of the present invention the utilizing step includes, for each of the plurality of authorized devices obtaining the content decryption key, wherein the obtaining includes performing exactly one decryption.

Moreover in accordance with a preferred embodiment of the present invention the method also includes at each authorized device having access to the protected content, performing) no more than a predetermined number of decryption operations, the predetermined number being the same for all authorized devices, to obtain the content decryption key from an encrypted form thereof, the encrypted form being encrypted with a group key corresponding to a group of which the authorized device is a member.

Further in accordance with a preferred embodiment of the present invention the predetermined number does not depend on the number of authorized devices.

Still further in accordance with a preferred embodiment of the present invention the predetermined number is equal to 1.

Moreover in accordance with a preferred embodiment of the present invention the method also includes the step of at at least one of the authorized devices, using the group key of the set of keys corresponding to the group of which the authorized device is a member.

Additionally in accordance with a preferred embodiment of the present invention each group key of the set of keys is assigned an initial value, and the initial value can not be changed.

Further in accordance with a preferred embodiment of the present invention the authorized set includes a plurality of maximal groups from the set of remaining groups, such that each maximal group is not a subset of any one of the set of remaining groups.

Still further in accordance with a preferred embodiment of the present invention the determining whether step includes receiving an identification of the at least one device.

Additionally in accordance with a preferred embodiment of the present invention each two devices of the plurality of authorized devices have at least one group key in common.

Moreover in accordance with a preferred embodiment of the present invention least some of the authorized devices are not in communication with a central authorization facility after an initial manufacturing period.

There is also provided in accordance with another preferred embodiment of the present invention a method for preventing a plurality of devices, chosen from among a plurality of authorized devices, from having access to protected content, the method including distributing a protected content access key independently encrypted with each group key of a set of group keys, wherein none of a plurality of devices to be prevented from having access to protected content are members of any group associated with any of the set of group keys.

Further in accordance with a preferred embodiment of the present invention each group key of the set of group keys has an initial value, and the initial value can not be changed.

Still further in accordance with a preferred embodiment of the present invention the method also includes at each authorized device having access to the protected content, performing no more than a predetermined number of decryption operations, the predetermined number being the same for all authorized devices, to obtain the protected content access key from an encrypted form thereof, the encrypted form being encrypted with a group key corresponding to a group of which the authorized device is a member.

Still further in accordance with a preferred embodiment of the present invention the predetermined number does not depend on the number of authorized devices.

Additionally in accordance with a preferred embodiment of the present invention the predetermined number is equal to 1.

Moreover in accordance with a preferred embodiment of the present invention the method also includes generating each of the group keys as a plurality of independently generated sets of group keys, wherein no group key of any one independently generated set is based, even in part, on any key of any other independently generated set.

Further in accordance with a preferred embodiment of the present invention the method also includes generating each of the group keys as a plurality of independently generated sets of group keys, wherein each group key is based, at least in part, pseudo-randomly on a source key.

Still further in accordance with a preferred embodiment of the present invention the method also includes dividing, the plurality of groups into a hierarchical set of groups, the hierarchical set of groups including a plurality of groups including at least a first group and a second group, each of the first group and the second group being associated with first and second group key generation information respectively, and generating a least one group key in each of the first group and the second group using the associated group key generation information, wherein the second group key generation information can be derived from the first group key generation information.

Additionally in accordance with a preferred embodiment of the present invention the second group is a subgroup of the first group.

Moreover in accordance with a preferred embodiment of the present invention the first group key generation information can not be derived from the second group key generation information.

Further in accordance with a preferred embodiment of the present invention at least one of the first group key generation information and the second group key generation information is embedded in at least one removable security device.

Still further in accordance with a preferred embodiment of the present invention the at least one removable security device includes, for at least one of the first group and the second group, a plurality of removable security devices.

Additionally in accordance with a preferred embodiment of the present invention at least a predetermined portion of the plurality of removable security devices is required for determining the associated group key generation information.

There is also provided in accordance with another preferred embodiment of the present invention a security element including a secret store operative to store a secret s, a first output path for outputting s, and a second output path for outputting f(s), where f is a function, wherein the first output path is functional only during a first period.

Further in accordance with a preferred embodiment of the present invention f=g(x), where x is an input value.

Still further in accordance with a preferred embodiment of the present invention the first period continues until the first output path has been used a predetermined number of times.

Additionally in accordance with a preferred embodiment of the present invention the first output path is functional for a predefined period of time.

Moreover in accordance with a preferred embodiment of the present invention the first output path is functional until a first predefined command is received by the security element.

Further in accordance with a preferred embodiment of the present invention the first period begins upon receipt of a second predefined command by the security element.

Still further in accordance with a preferred embodiment of the present invention the apparatus also includes an external communication module, and at least one of the following is received from a source external to the security element, via the external communication module: the first predefined command, and the second predefined command.

Further in accordance with a preferred embodiment of the present invention the security element also includes a secret derivation unit operative to derive the secret s from a supplied input.

Still further in accordance with a preferred embodiment of the present invention the secret derivation unit is operative to derive the secret s from the supplied input based, at least in part, on pseudo-random generation.

Additionally in accordance with a preferred embodiment of the present invention the supplied input is supplied by a key escrow unit external to the security element.

Moreover in accordance with a preferred embodiment of the present invention the secret s is supplied by a key escrow unit external to the security element.

Further in accordance with a preferred embodiment of the present invention the security element functions as a key escrow component.

There is also provided in accordance with another preferred embodiment of the present invention a system for content access control operative to enable authorized devices to access protected content and to prevent unauthorized devices from accessing protected content, the system including grouping apparatus operative to divide a plurality of authorized devices into a plurality of groups, each of the plurality of authorized devices being included in at least one of the plurality of groups, no two devices of the plurality of authorized devices being included in exactly the same groups, prevention determination apparatus operative to determine whether at least one device of the plurality of authorized devices is to be prevented from having access to the protected content and, if at least one device is to be prevented, to remove all groups including the at least one device from the plurality of groups, thus producing a set of remaining groups, and authorized set determination apparatus operative to determine an authorized set including groups from the set of remaining groups, such that each device of the plurality of authorized devices which was not determined, in the determining whether step, to be prevented from having access is included in at least one group of the authorized set.

Further in accordance with a preferred embodiment of the present invention the system also includes key assignment apparatus operative to assign, to each one of the plurality of authorized devices, a set of keys including one group key for each group of which the one device is a member, and utilization apparatus operative to utilize at least some of the (group keys for communication of a content decryption key to at least one of the plurality of authorized devices.

There is also provided in accordance with another preferred embodiment of the present invention a method for black box analysis of a device capable of accessing protected content, the method including providing a device to be analyzed, inputting to the device a data item including encrypted protected content and a plurality of encrypted versions of a content key for accessing the protected content, each of the plurality of encrypted versions being encrypted in accordance with a different one of a plurality of group keys, receiving, from the device, decrypted content representing a decryption of the protected content, determining whether the received content is one of the following erroneous, and null, and producing a result, identifying a set of group keys including at least one group key which is known to the device based, at least in part, on the result, wherein the data item also includes at least one invalid content key encrypted in accordance with one of the plurality of group keys.

There is also provided in accordance with another preferred embodiment of the present invention a method for black box analysis of a device capable of accessing protected content, the method including providing a device to be analyzed, inputting to the device a data item including encrypted protected content and a plurality of encrypted versions of a content key for accessing the protected content, each of the plurality of encrypted versions being encrypted in accordance with a different one of a plurality of group keys, receiving, from the device, decrypted content representing a decryption of the protected content, determining whether the received content is one of the following erroneous, and null and producing a result, identifying a set of group keys including at least one group key which is known to the device based, at least in part, on the result, wherein the data item also includes at least one invalid content key encrypted in accordance with one of the plurality of group keys, and the protected content is protected in accordance with a method for content access control as described above.

Further in accordance with a preferred embodiment of the present invention the method also includes performing the following steps at least once before performing the identifying step: choosing a new plurality of encrypted versions of the content key, and performing the inputting receiving and determining steps.

Further in accordance with a preferred embodiment of the present invention the choosing a new plurality step includes choosing based, at least in part, on at least one of the following: at least one result of the determining step performed before the choosing step, and the plurality of encrypted versions of the content key used in the inputting step performed before the choosing step.

Still further in accordance with a preferred embodiment of the present invention the identifying step includes identifying the one of the plurality of group keys with which the invalid content key is encrypted.

Additionally in accordance with a preferred embodiment of the present invention the identifying step includes identifying a group key which is not one of the plurality of group keys with which the invalid content key is encrypted.

Moreover in accordance with a preferred embodiment of the present invention the identifying step includes identifying a group key which is one of the plurality of group keys with which the invalid content key is encrypted.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
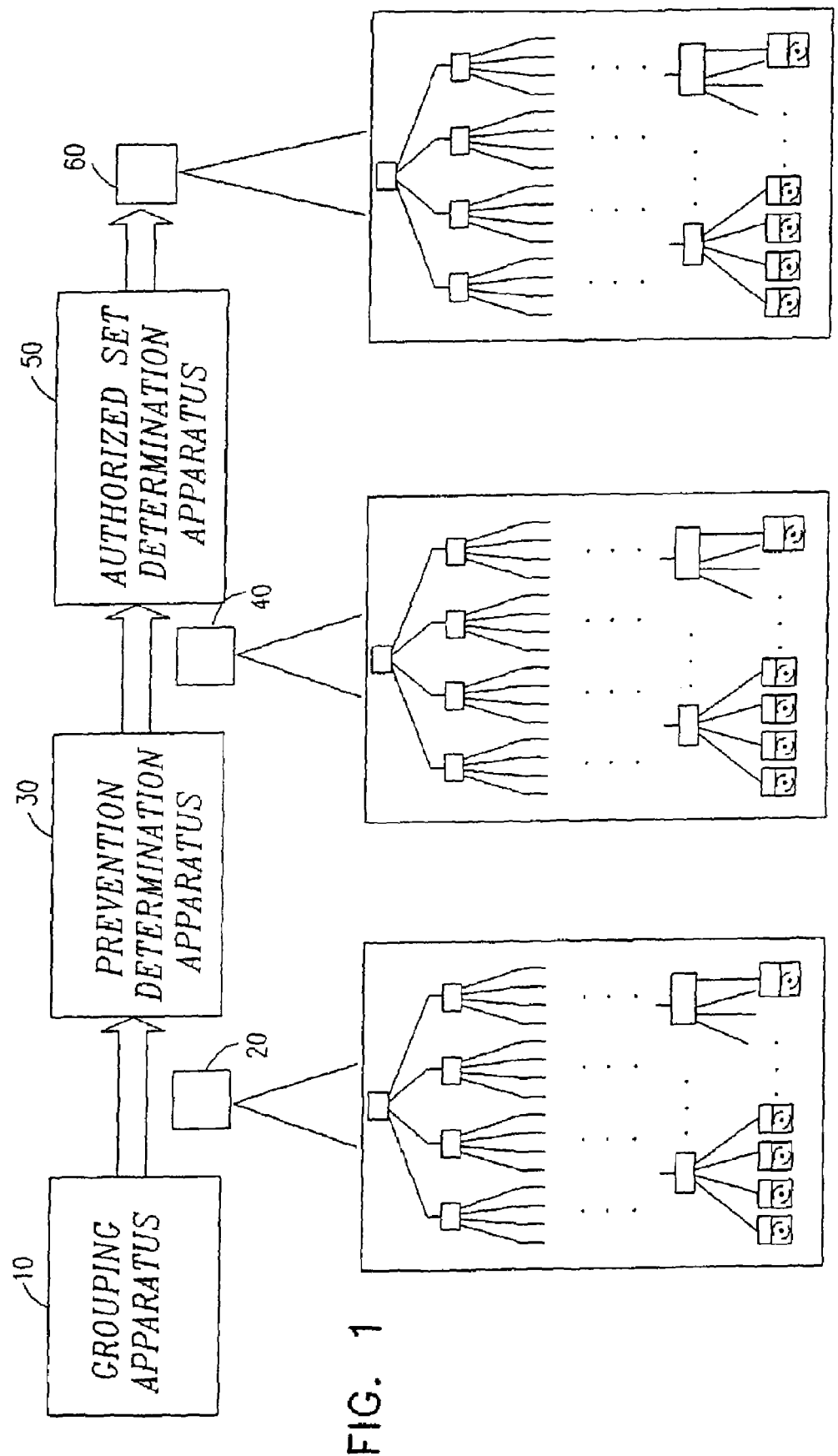
FIG. 1 is a simplified partially pictorial, partially block diagram illustration of a system for content access control, constructed and operative in accordance with a preferred embodiment of the present invention.

Reference is now made to FIG. 1 which is a simplified partially pictorial, partially block diagram illustration of a system for content access control, constructed and operative in accordance with a preferred embodiment of the present invention. Each of the components of FIG. 1 is preferably implemented in a combination of software and computer hardware, as is well known in the art, and may include special purpose computer hardware, as is also well known in the art, in order to increase efficiency of operation.

The system of FIG. 1 comprises grouping apparatus 10. The grouping apparatus 10 is preferably operative to receive information describing a plurality of devices and to divide the plurality of authorized devices into a plurality of groups. Preferably, the division into a plurality of groups is such that each of the plurality of authorized devices in comprised in at least one of the plurality of groups. Further preferably, no two devices of the plurality of authorized devices are comprised in exactly the same groups; that is, the groups associated with each device are different, at least in one group, from the groups associated with every other device. A plurality of group assignments 20 is preferably produced by the grouping apparatus 10.

Without limiting the generality of the foregoing, in a preferable implementation of the group assignments 20 as shown in FIG. 1, the group assignments 20 may comprise a hierarchical arrangement of group assignments, which may be depicted as a tree in which each one of the plurality of authorized devices is represented by a leaf. Such a preferred implementation is discussed in more detail below with reference to FIG. 2. The tree implementation is believed to be preferred whenever the number of keys is less than approximately the logarithm of the number of devices, it is appreciated that other implementations may also be used, particularly if the number of keys is greater than that stated above.

The system of FIG. 1 also preferably comprises prevention determination apparatus 30, preferably receiving the group assignments 20 from the grouping apparatus 10 and preferably operative to determine whether at least one device of the plurality of authorized devices is to be prevented from having access to protected content. Some implementations of such a determination is well known in the art and may be based on information supplied by a human operator of the system of FIG. 1, though automatic information gathering, or otherwise. A black box method, such as the method described below with reference to FIG. 5, may also be used.

The prevention determination apparatus 30 is also preferably operative to remove from the group assignments 20 all groups of which the at least one device is a member, thus producing a set of remaining groups 40. Throughout the present specification and claims, even if the prevention determination apparatus 30 determines that no devices are to be prevented from having access to protected content, it is appreciated that the prevention determination apparatus 30 preferably still outputs a set of remaining groups 40, which in such a case would be preferably the same as the group assignments 20.

The system of FIG. 1 also preferably includes authorized set determination apparatus 50. The authorized set determination apparatus 50 preferably receives the set of remaining groups 40 and is preferably operative to produce therefrom an authorized set 60. The authorized set 60 produced by the authorized set determination apparatus 50 preferably includes, for each device which was not determined by the prevention determination apparatus 30 to be prevented from receiving content, at least one group of which that device is a member.

Preferably, the authorized set 60 comprises a plurality of maximal groups from the set of remaining groups 40, each maximal group not being a subset of any member of the set of remaining groups. In other words, the authorized set 60 comprises an optimized set of maximal groups, no maximal group being a subset of any other group in the authorized set 60.

The operation of the system of FIG. 1 is now briefly described.

Figure 2:
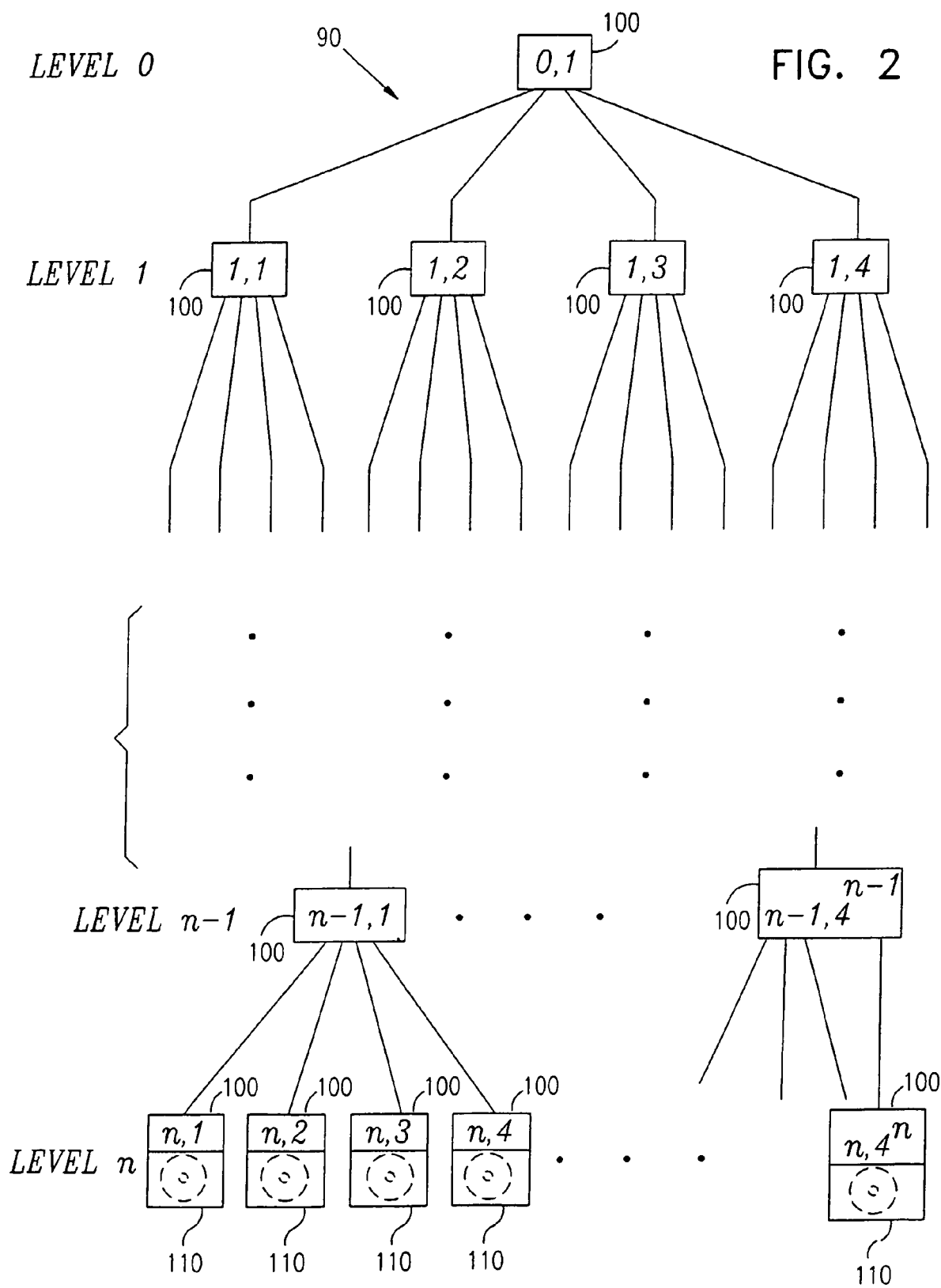
FIG. 2 is a simplified pictorial illustration of a preferred implementation of a portion of the system of FIG. 1.

Reference is now additionally made to FIG. 2, which is a simplified pictorial illustration of a preferred implementation of the group assignments 20 of FIG. 1. The preferred implementation of FIG. 2, depicted as a tree 90, comprises a hierarchical arrangement of groups on n levels, each group 100 being understood to have, as members, all of the groups beneath said group 100 in the tree. At level n, the leaf level, each group 100 is associated with a device 110. While the implementation of FIG. 2 is depicted as a balanced tree having 4 branches at each level, it is appreciated that the tree need not be balanced and that any other appropriate number of branches at each level may be used.

Before any device is determined by the prevention determination apparatus 30 to be prevented from receiving content, it is appreciated that the authorized set 60 may comprise only the root node (0,1) of FIG. 2, since all devices 110 are members of the group associated with (0,1). It is further appreciated that, if a single device 110 associated, by way of example only, with the group 100 (n,4) is to be prevented from receiving content, then the authorized set 60 will preferably be determined to comprise, in the example of a 4 branch tree, 3 groups for each level of the tree; that only 3 groups are needed may be appreciated as follows:

the group 100 (n−1,1) must be removed, so that the groups 100 (n,1), (n,2), and (n,3) must now be used for the associated devices 110;

the parent of the group 100 (n−1,1), namely the group (n−2,1) must be removed, so that the groups (n−1,2), (n−1,3), and (n−1,4) must now be used; and so forth, with finally the group 100 (0,1), no longer being used.

It will be appreciated that the system of FIG. 1 is particularly useful as a solution to the key distribution problem in a case where a key is assigned to each of the groups 100 of FIG. 2. At any point, the keys of all groups 100 in the authorized set 60 are used, independently, to encrypt K; if at some point there are g groups in the authorized set 60, g separately encrypted versions preferably are used.

At first only one key, the key assigned to the group 100 (0,1), need be used. When a single device 110 is removed, 3 keys are used for each level of the tree 90 of FIG. 2. It is appreciated that the number of keys might actually be smaller. If, for example, four consecutive devices 110 corresponding to groups 100 (n,1) through (n,4) are stolen and reverse engineered, fewer keys are needed than if only one device is compromised.

In the case of key generation it is appreciated that multiple smart cards, each comprising only a portion of the information necessary to generate keys, may be used to store the information necessary to generate keys: such an arrangement is believed to supply additional security at key generation time, since misappropriation of a single card is not sufficient to compromise the keys generated therewith.

In order to improve security, it is appreciated that it would be desirable for a smart card used in generating a key to be operative to provide a secret incorporated in the smart card to an associated device only during a particular time period, only a certain number of times, or in a similarly appropriately restricted manner; a preferred embodiment of the present invention useful in this connection is described below with reference to FIG. 4.

It is further appreciated that the system of FIG. 1 preferably makes the following desirable features possible:

1. Where K is a content encryption key or any other useful key, for example, device 110 can easily determine, based on group membership of the device 110 and, preferably, group identification accompanying each encryption of K in a key block B, which encryption the device 110 can use to obtain K. Thus, each device 110 need only perform one decryption operation in order to obtain K. It is appreciated that a further, typically fixed number of decryption operations, as is well known in the art, may need to be performed in order to actually obtain protected content. The total number of decryption operations needed would thus not be dependent on the number of devices 110.

2. Each group key may be assigned an initial value, which initial value need not be changed; generally, for proper operation of the system of FIG. 1, the initial value can not be changed. It is appreciated that the value of any one group key, in a preferred embodiment of the present invention, need not depend on the value of any other group key. It is further appreciated that, therefore, each group key may be assigned a value arbitrarily such as, for example, pseudo-randomly. Advantageously, such pseudo-random (generation may depend upon data items such as device serial number, key-group identity, and some secret.

3. Some, or even all, of the devices 110 need not be in communication with a central authorization facility (not shown), since no communication with a central authorization facility is necessary to implement the system of FIG. 1.

4. Because of the independence of keys as described above, it is possible to divide the tree of FIG. 2 into different logical trees; for example, each of the groups 100 (1,1), (1,2), (1,3), and (1,4) may represent different organizations each of which may independently generate keys. In such a scenario, the key of the group 100 (0,1) may or may not be used. Each organization may then use methods well known in the art to generate keys for all groups below the organization's croup in the hierarchy, such that the high level in the hierarchy may derive keys for a lower level, but the lower level can not derive a key for a higher level. It is appreciated that such a method may also be used in a case where there is no division into logical trees.

The expressions "can be derived" and "can not be derived", along with other grammatical forms thereof, as used throughout the present specification and claims, refer to derivation by efficient computation, it being appreciated that inefficient computation methods, such as brute force search methods, may be used to obtain b from a even though b "can not be derived" from a according to the above definition. For example and without limiting the generality of the foregoing, pseudo-random number generation is generally considered to be a process wherein a long pseudo-random number sequence may be derived from a relatively short seed, but the seed can not be derived from the pseudo-random number sequence.

Figure 3:
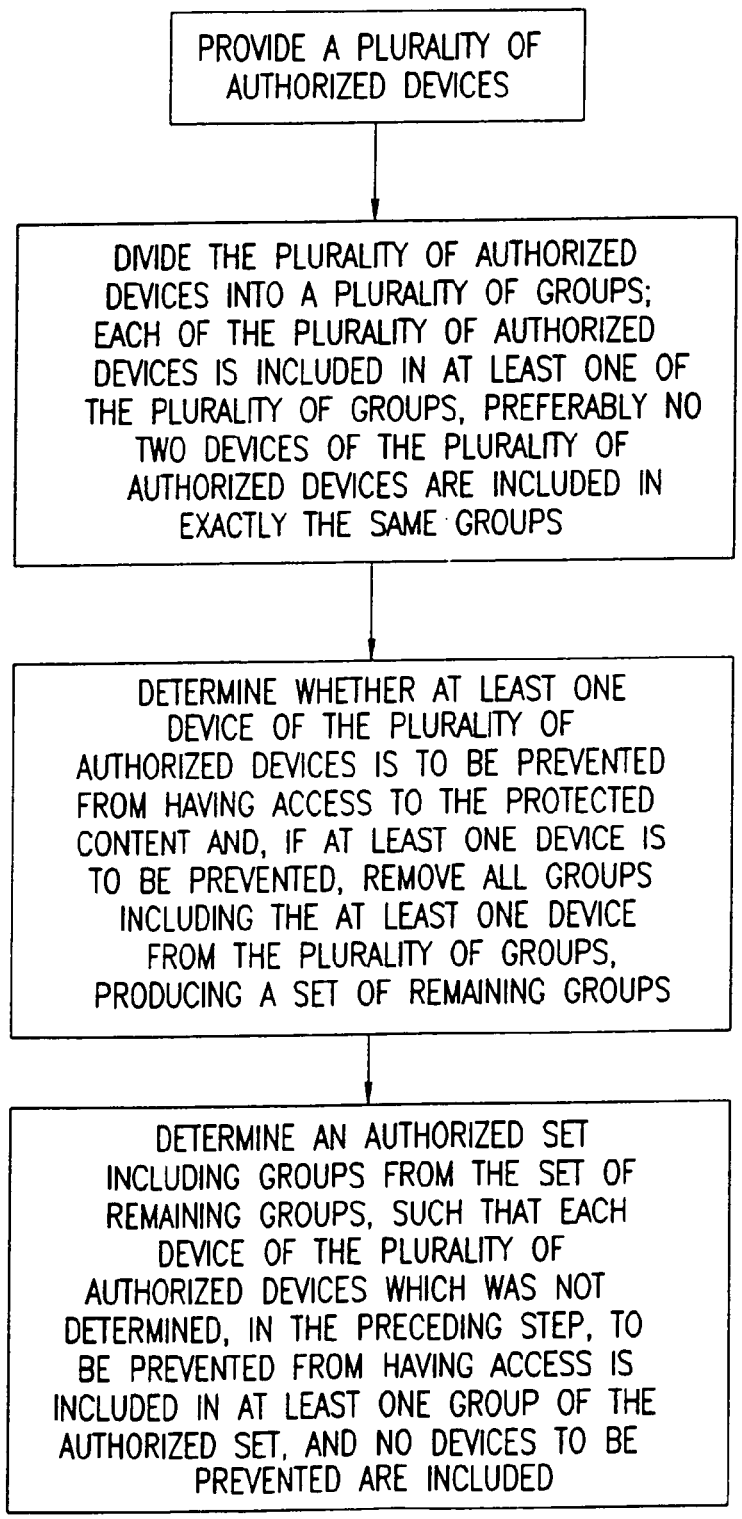
FIG. 3 is a simplified flowchart illustration of a preferred method of operation of the system of FIG. 1.

Reference is now made to FIG. 3, which is a simplified flowchart illustration of a preferred method of operation of the system of FIG. 1. The method of FIG. 3 is self-explanatory with reference to the above discussion of FIG. 1.

Figure 4:
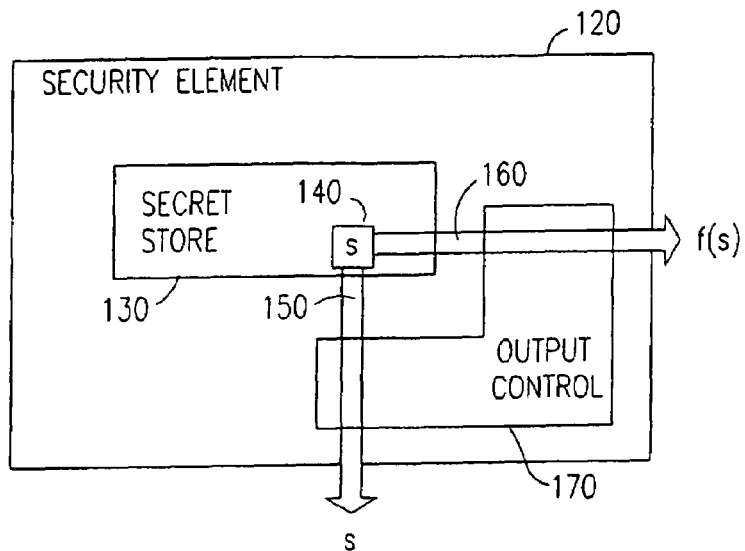
FIG. 4 is a simplified block diagram illustration of a security element, constructed and operative in accordance with another preferred embodiment of the present invention.

Reference is now made to FIG. 4, which is a simplified block diagram illustration of a security element, constructed and operative in accordance with another preferred embodiment of the present invention. The apparatus of FIG. 4 comprises a security element 120. Preferably, the security element 120 is implemented in a tamper resistant package as a removable security element, such as a smart card, smart cards being well known in the art. Individual components, described below, of the security element 120 may be implemented in hardware or in any suitable combination of hardware and software, as is well known in the art.

The security element 120 preferably comprises a secret store 130, the secret store 130 being preferably operative to store a secret s 140 in such a way that the secret s 140 may not be discerned, under normal circumstances, from outside of the security element 120. It is appreciated that a typical role of the security element 10 would be to supply the secret s 140, or some form thereof or other item derived therefrom, only under predefined circumstances, typically under circumstances predefined at a time of manufacture of the security element 120. Thus, the security element 120 is preferably operative to provide the secret s 140 only under predefined circumstances.

The security element 120 preferably comprises a first output path 150, the first output path being preferably operative, only under predefined circumstances as described above, to output s. It is appreciated that, optionally, the first output path 150 may also function as an input path. The security element 120 also preferably comprises a second output path 160, the second output path being preferably operative, only under predefined circumstances as described above, to output some function f(s), f comprising any appropriate function. For example, and without limiting the generality of the foregoing, if s represents some secret f might comprise a hash function, so that f(s) comprises the hash of s according to f. It is appreciated that some input value x may also be supplied through the first output path 150, if functioning as an input path as described above, or through another input path (not shown). In such a case the function f would preferably be variable according to another function g, such as, for example, f=g(x). Use of a variable function f, parameterized according to an input as described above, may be preferred.

The security element 120 also preferably but optionally comprises an output control 170, the preferable operation of which is described below.

The operation of the apparatus of FIG. 4 is now briefly described. During a first period, under predefined circumstances as described above, the security element 120 is preferably operative to output s via the first output path 150. During, a second period, typically following, the first period, and under predefined circumstances as described above, the security element 120 is preferably operative to output not s, but f(s). The terms "First period" and "second period" are used throughout the present specification and claims to refer either to: periods of time such as, for example, 30 days or 5 minutes; or operationally defined periods, such as until the secret s has been output a predetermined number of times, such as, for example 1 time.

It is appreciated that a wide variety of possible mechanisms may be used for arranging for the output of the security element 120 to be different between the first period and the second period, as described above. One preferred implementation of so arranging the output of the security element 120 would be to use the optional output control 170 to enforce the desired output behavior. In such a case, the output control 170 would preferably comprise one or both of: appropriate counting hardware and/or software, to count the number of times that the secret s has been output; or appropriate timing hardware and/or software to determine the periods of time.

It is appreciated that the security element 120 might be especially useful, as described above with reference to FIG. 1, in a context where a smart card used in generating a key would be operative to provide a secret incorporated in the smart card to an associated device only during a particular time period, only a certain number of times, or in a similarly appropriately restricted manner. It is further appreciated that the security element 120 might comprise one element only of such a smart card, the other elements being conventional elements well known in the art or other elements not directly related to the functioning of the security element 120.

Figure 5:
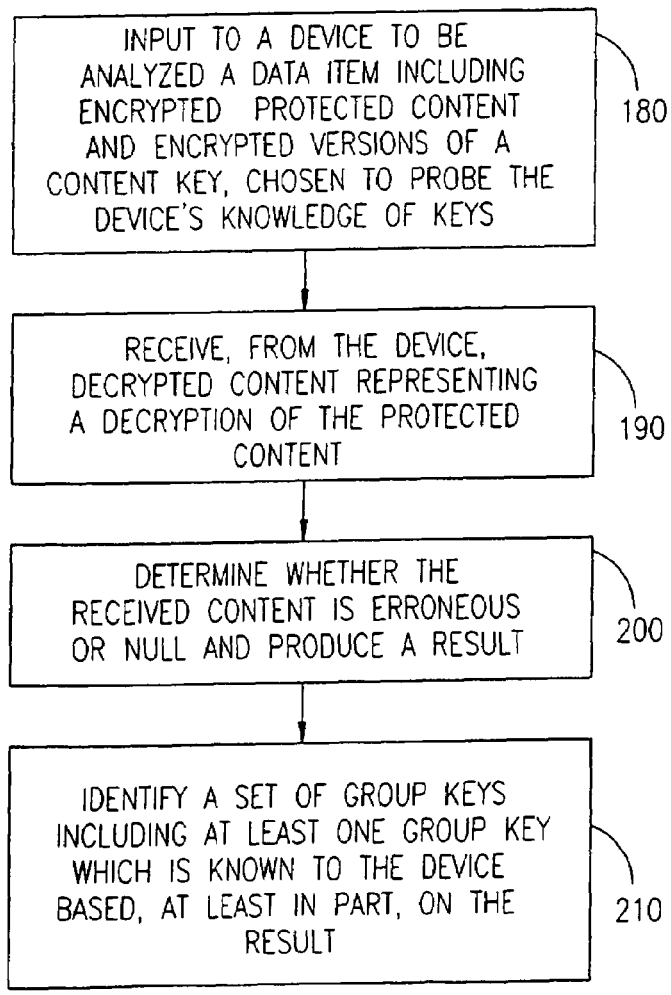
FIG. 5 is a simplified flowchart illustration of a method for black box analysis of a device capable of accessing protected content, the method being operative in accordance with another preferred embodiment of the present invention and being useful in conjunction with the system of FIG. 1.

Reference is now made to FIG. 5, which is a simplified flowchart illustration of a method for black box analysis of a device capable of accessing protected content, the method being operative in accordance with another preferred embodiment of the present invention and being useful in conjunction with the system of FIG. 1. The term "black box analysis" is a term of art used throughout the present specification and claims to refer to analysis of a device to determine which secrets the device "knows" by challenge and response without reverse engineering of the device. Preferably, the method of FIG. 5 is used to determine information about the device's knowledge of keys; that is to say, which keys are available to the device for accessing protected content.

The method of FIG. 5 is believed to be particularly useful in cases where the system of FIG. 1 and related methods, such as the method of FIG. 3, are used to protect content and for key management.

The method of FIG. 5 preferably includes the following steps:

A data item is input to a device to be analyzed (step 180). Preferably the data item includes encrypted protected content and a plurality of encrypted versions of a content key, chosen to probe the device's knowledge of keys. In a case where the system of FIG. 1 is in use, the plurality of encrypted versions are preferably encrypted in accordance with various group keys. The data item also preferably includes at least one invalid content key encrypted in accordance with one of the plurality of group keys. The term "invalid", as used throughout the present specification and claims in referring to a key, is also intended to include a null key.

It is appreciated that a possibility is thus set up for the remainder of the method of FIG. 5 to determine whether the key with which the invalid content key is encrypted is known to the device. It is further appreciated that more than one such invalid content key may be used. It is still further appreciated that only one valid content key or, alternatively, more than one valid content key, may be used.

It is further appreciated that, in order to thwart a cleverly designed pirate device from determining that a black box analysis is underway and therefore producing false results, the various group keys are preferably chosen to represent as plausible set of keys that might actually be in use after a plurality of devices has been blacklisted.

Decrypted content representing a decryption of the protected content is received from the device (step 190), and a determination is made as to whether the received content is erroneous or null (step 200); a result is preferably produced indicating what was determined in step 200. It is appreciated that the determination of step 200 may be made in a wide variety of ways, including determining by analysis, such as with use of an analyzing instrument, or determining via the senses. As an example of determining via the senses and without limiting the generality of the foregoing, a human tester of a device which is intended to produce music might determine that the received content is erroneous or null by simply listening to the received content.

If possible, a set of group keys including at least one group key which is known to the device is identified, based, at least in part, on the result of step 200 (step 210) It is appreciated that, under some circumstances, if no erroneous or null content is produced, for example, no determination can be made that the specific key with which the erroneous content key was encrypted is known to the device. In other cases, where more than one erroneous content key was provided, a list of group keys may be produced, one of which at least is known to the device. In still other cases, where erroneous or null content is produced and exactly one erroneous content key was provided, the group key with which the erroneous content key was encrypted is determined to be known to the device; provided that the device was not cleverly designed to simulate such a result.

It is appreciated that, preferably, the method of FIG. 5 may be performed iteratively with different choices of group keys, particularly with different group keys used to encrypt the erroneous content key, in order to obtain further information about keys known to the device. It is appreciated that, most effectively, choices as to group keys may be based on group keys previously used and on results previously obtained.

It is further appreciated that a preferable goal of black box analysis is to produce a set of keys which pirate devices do not use for decoding protected content, but which are known to all valid devices. It is also appreciated that it would be advantageous for the set of keys to be as small as possible.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A method for content access control operative to enable authorized devices to access protected content and to prevent unauthorized devices from accessing protected content, the method comprising:
   providing a plurality of authorized devices, each of the plurality of authorized devices belonging to a plurality of groups and each of the devices being supplied with a plurality of group keys, each of said group keys supplied to a given one of the plurality of authorized devices corresponding to one of the plurality of groups to which the authorized device belongs, at least most of the plurality of authorized devices having a plurality of group keys which is at least partially different from the plurality of group keys of the remaining one of the plurality of authorized devices; and
   thereafter, when at least one of said plurality of authorized devices is to be denied access to said protected content, sending protected content to said plurality of authorized devices which content is encrypted in a manner such that all group keys supplied to said at least one of said plurality of authorized devices to be denied access to said protected content are unable to enable access to said protected content.

2. A method according to claim 1 and also comprising:
   utilizing at least some of the group keys for communication of a content decryption key to at least one of the plurality of authorized devices.

3. A method according to claim 2 and wherein the utilizing step comprises, for each of the plurality of authorized devices:
   obtaining the content decryption key, wherein the obtaining comprises performing no more than a predetermined number of decryptions.

4. A method according to claim 2 and wherein the utilizing step comprises, for each of the plurality of authorized devices:
   obtaining the content decryption key, wherein the obtaining comprises performing exactly one decryption.

5. A method according to claim 2 and also comprising:
   at each authorized device having access to the protected content, performing no more than a predetermined number of decryption operations, said predetermined number being the same for all authorized devices, to obtain the content decryption key from an encrypted form thereof, said encrypted form being encrypted with a group key corresponding to a group of which said authorized device is a member.

6. A method according to claim 5 and wherein said predetermined number does not depend on the number of authorized devices.

7. A method according to claim 5 and wherein said predetermined number is equal to 1.

8. A method according to claim 2 and also comprising the step of:
   at at least one of the authorized devices, using the group key of the set of keys corresponding to the group of which the authorized device is a member.

9. A method according to claim 2 and wherein each group key of the set of keys is assigned an initial value, and said initial value can not be changed.

10. A method according to claim 2 and also comprising:
    generating each of said group keys as a plurality of independently generated sets of group keys, wherein no group key of any one independently generated set is based, even in part, on any key of any other independently generated set.

11. A method according to claim 2 and also comprising:
    generating each of said group keys as a plurality of independently generated sets of group keys, wherein each group key is based, at least in part, pseudo-randomly on a source key.

12. A method according to claim 2 and also comprising:
    dividing the plurality of groups into a hierarchical set of groups, said hierarchical set of groups comprising a plurality of groups comprising at least a first group and a second group, each of said first group and said second group being associated with first and second group key generation information respectively; and
    generating a least one group key in each of said first group and said second group using said associated group key generation information, wherein
    said second group key generation information can be derived from said first group key generation information.

13. A method according to claim 12 and wherein said second group is a subgroup of said first group.

14. A method according to claim 12 and wherein said first group key generation information can not be derived from said second group key generation information.

15. A method according to claim 12 and wherein at least one of said first group key generation information and said second group key generation information is embedded in at least one removable security device.

16. A method according to claim 15 and wherein said at least one removable security device comprises, for at least one of said first group and said second group, a plurality of removable security devices.

17. A method according to claim 16 and wherein at least a predetermined portion of said plurality of removable security devices is required for determining the associated group key generation information.

18. A method according to claim 1 and wherein the authorized set comprises a plurality of maximal groups from the set of remaining groups, such that each maximal group is not a subset of any one of the set of remaining groups.

19. A method according to claim 1 wherein the determining whether step comprises receiving an identification of the at least one device.

20. A method according to claim 1 and wherein each two devices of the plurality of authorized devices have at least one group key in common.

21. A method according to claim 1 and wherein at least some of the authorized devices are not in communication with a central authorization facility after an initial manufacturing period.

22. A method for preventing a plurality of devices, chosen from among a plurality of authorized devices, from having access to protected content, the method comprising:
    distributing a protected content access key independently encrypted with each group key of a set of group keys, wherein none of a plurality of devices to be prevented from having access to protected content are members of any group associated with any of the set of group keys; and
    thereafter, when at least one of said plurality of authorized devices is to be denied access to said protected content, sending protected content to said plurality of authorized devices which content is encrypted in a manner such that all group keys supplied to said at least one of said plurality of authorized devices to be denied access to said protected content are unable to enable access to said protected content.

23. A method according to claim 22 and wherein each group key of the set of group keys has an initial value, and the, initial value can not be changed.

24. A method according to claim 22 and also comprising:
    at each authorized device having access to the protected content; performing no more than a predetermined number of decryption operations, said predetermined number being the same for all authorized devices, to obtain the protected content access key from an encrypted form thereof, said encrypted form being encrypted with a group key corresponding to a group of which said authorized device is a member.

25. A method according to claim 24 and wherein said predetermined number does not depend on the number of authorized devices.

26. A method according to claim 25 and wherein said predetermined number is equal to 1.

27. A method according to claim 22 and also comprising:
    generating each of said group keys as a plurality of independently generated sets of group keys, wherein no group key of any one independently generated set is based, even in part, on any key of any other independently generated set.

28. A method according to claim 22 and also comprising:
    generating each of said group keys as a plurality of independently generated sets of group keys, wherein each group key is based, at least in part, pseudo-randomly on a source key.

29. A method according to claim 22 and also comprising:
    dividing the plurality of groups into a hierarchical set of groups, said hierarchical set of groups comprising a plurality of groups comprising at least a first group and a second group, each of said first group and said second group being associated with first and second group key generation information respectively; and
    generating a least one group key in each of said first group and said second group using said associated group key generation information, wherein
    said second group key generation information can be derived from said first group key generation information.

30. A system for content access control operative to enable authorized devices to access protected content and to prevent unauthorized devices from accessing protected content, the system comprising:
    key assignment apparatus operative to supply group keys to a plurality of authorized devices, each of the plurality of authorized devices belonging to a plurality of groups and each of the devices being supplied with a plurality of group keys, each of the group keys supplied to a given one of the plurality of groups to which the authorized device belongs, at least most of the plurality of authorized devices having a plurality of group keys which is partially different from the plurality of group keys of the remaining one of the plurality of authorized devices; and
    a content distributor operative to send protected content to said plurality of authorized devices which content is encrypted in a manner such that all group keys supplied to said at least one of said plurality of authorized devices to be denied access to said protected content are unable to enable access to said protected content when at least one of said plurality of authorized devices is to be denied access to said protected content.

31. A system according to claim 30 and also comprising:
    utilization apparatus operative to utilize at least some of the group keys for communication of a content decryption key to at least one of the plurality of authorized devices.

32. A method for black box analysis of a device capable of accessing protected content, the method comprising:
    providing a device to be analyzed;
    inputting to the device a data item comprising encrypted protected content and a plurality of encrypted versions of a content key for accessing the protected content, each of the plurality of encrypted versions being encrypted in accordance with a different one of a plurality of group keys;
    receiving, from the device, decrypted content representing a decryption of the protected content;
    determining whether the received content is one of the following:
        erroneous; and
        null, and producing a result;
    identifying a set of group keys comprising at least one group key which is known to the device based, at least in part, on the result,
    wherein the data item also comprises at least one invalid content key encrypted in accordance with one of the plurality of group keys, and
    the protected content is protected in accordance with the following method:
        providing a plurality of authorized devices;
        dividing the plurality of authorized devices into a plurality of groups, each of the plurality of authorized devices being comprised in at least one of the plurality of groups, no two devices of the plurality of authorized devices being comprised in exactly the same groups;

determining whether at least one device of the plurality of authorized devices is to be prevented from having access to the protected content and, if at least one device is to be prevented, removing all groups comprising the at least one device from the plurality of groups, thus producing a set of remaining groups; and determining an authorized set comprising groups from the set of remaining groups, such that each device of the plurality of authorized devices which was not determined, in the determining whether, to be prevented from having access is comprised in at least one group of the authorized set.

33. The method according to claim 32 and also comprising:

assigning, to each one of the plurality of authorized devices, a set of keys comprising one group key for each group of which the one device is a member; and utilizing at least some of the group keys for communication of a content decryption key to at least one of the plurality of authorized devices.

34. The method according to claim 33 and wherein the utilizing comprises, for each of the plurality of authorized devices:

obtaining the content decryption key, wherein the obtaining comprises performing no more than a predetermined number of decryptions.

35. The method according to claim 33 and wherein the utilizing comprises, for each of the plurality of authorized devices:

obtaining the content decryption key, wherein the obtaining comprises performing exactly one decryption.

36. The method according to claim 33 and also comprising:

at each authorized device having access to the protected content, performing no more than a predetermined number of decryption operations, said predetermined number being the same for all authorized devices, to obtain the content decryption key from an encrypted form thereof, said encrypted form being encrypted with a group key corresponding to a group of which said authorized device is a member.

37. The method according to claim 36 and wherein said predetermined number does not depend on the number of authorized devices.

38. The method according to claim 36 and wherein said predetermined number is equal to 1.

39. The method according to claim 33 and also comprising:

at at least one of the authorized devices, using the group key of the set of keys corresponding to the group of which the authorized device is a member.

40. The method according to claim 33 and wherein each group key of the set of keys is assigned an initial value, and said initial value can not be changed.

41. The method according to claim 33 and also comprising:

generating each of said group keys as a plurality of independently generated sets of group keys, wherein no group key of any one independently generated set is based, even in part, on any key of any other independently generated set.

42. The method according to claim 33 and also comprising:

generating each of said group keys as a plurality of independently generated sets of group keys, wherein each group key is based, at least in part, pseudo-randomly on a source key.

43. The method according to claim 33 and also comprising:

dividing the plurality of groups into a hierarchical set of groups, said hierarchical set of groups comprising a plurality of groups comprising at least a first group and a second group, each of said first group and said second group being associated with first and second group key generation information respectively; and generating a least one group key in each of said first group and said second group using said associated group key generation information, wherein said second group key generation information can be derived from said first group key generation information.

44. The method according to claim 32 and wherein the authorized set comprises a plurality of maximal groups from the set of remaining groups, such that each maximal group is not a subset of any one of the set of remaining groups.

45. The method according to claim 32 wherein the determining whether comprises receiving an identification of the at least one device.

46. The method according to claim 32 and wherein each two devices of the plurality of authorized devices have at least one group key in common.

47. The method according to claim 32 and wherein at least some of the authorized devices are not in communication with a central authorization facility after an initial manufacturing period.

* * * * *

UNITED STATES PATENT AND TRADEMARK OFFICE
CERTIFICATE OF CORRECTION

PATENT NO. : 7,263,611 B2  Page 1 of 1
APPLICATION NO. : 11/050110
DATED : August 28, 2007
INVENTOR(S) : Yevgeny Yakov Gene Itkis It is certified that error appears in the above-identified patent and that said Letters Patent is hereby corrected as shown below:

column 10, line 38, "croup" should read -- group -- column 15, line 42, (original claim 15) "the," should read -- the --

Signed and Sealed this

Ninth Day of February, 2010

David J. Kappos
*Director of the United States Patent and Trademark Office*